United States Patent
Kono et al.

(10) Patent No.: US 8,022,659 B2
(45) Date of Patent: Sep. 20, 2011

(54) CONTROL APPARATUS FOR AC ROTARY MACHINE AND CONTROL METHOD FOR AC ROTARY MACHINE

(75) Inventors: Masaki Kono, Tokyo (JP); Hiroyuki Kayano, Tokyo (JP); Tsuneyasu Kakizaki, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 546 days.

(21) Appl. No.: 12/294,196

(22) PCT Filed: May 25, 2006

(86) PCT No.: PCT/JP2006/310462
§ 371 (c)(1),
(2), (4) Date: Sep. 23, 2008

(87) PCT Pub. No.: WO2007/138644
PCT Pub. Date: Dec. 6, 2007

(65) Prior Publication Data
US 2009/0167236 A1 Jul. 2, 2009

(51) Int. Cl.
*H02P 27/06* (2006.01)
(52) U.S. Cl. ........................ 318/812; 318/807; 318/808
(58) Field of Classification Search .................. 318/729, 318/798–801, 807, 808, 811, 812
See application file for complete search history.

(56) References Cited

U.S. PATENT DOCUMENTS

| | | | | |
|---|---|---|---|---|
| 5,448,150 | A * | 9/1995 | Yamamoto et al. | 318/805 |
| 5,959,430 | A * | 9/1999 | Yuki et al. | 318/805 |
| 6,809,492 | B2 * | 10/2004 | Harakawa et al. | 318/609 |
| 2003/0020428 | A1 * | 1/2003 | Masaki et al. | 318/727 |
| 2008/0048607 | A1 * | 2/2008 | Kono | 318/802 |

FOREIGN PATENT DOCUMENTS

| | | | |
|---|---|---|---|
| JP | 61-231805 | A | 10/1986 |
| JP | 08-336292 | A | 12/1996 |
| JP | 2002-084780 | A | 3/2002 |
| JP | 2002-095299 | A | 3/2002 |

* cited by examiner

*Primary Examiner* — Bentsu Ro
(74) *Attorney, Agent, or Firm* — Buchanan Ingersoll & Rooney PC

(57) ABSTRACT

A control apparatus for a rotary machine, comprising a variable-voltage variable frequency (VVVF) inverter for driving the rotary machine, a voltage detector for detecting a DC voltage at the inverter's input, current detectors for detecting phase currents of the rotary machine, an inverter-electric-power command unit for determining an inverter-electric-power command value, an actual-inverter-electric-power calculation unit for calculating an actual inverter-electric-power value, a secondary-magnetic-flux command calculation unit for calculating a secondary-magnetic-flux command value, a predetermined-secondary-magnetic-flux command unit for outputting a predetermined secondary-magnetic-flux command value, and a secondary-magnetic-flux command changeover unit for selecting either one of the secondary-magnetic-flux command value and the predetermined secondary-magnetic-flux command value as a secondary-magnetic-flux command value which is used to control the rotary machine.

10 Claims, 10 Drawing Sheets

CONTROL APPARATUS FOR AC ROTARY MACHINE AND CONTROL METHOD FOR AC ROTARY MACHINE

TECHNICAL FIELD

The present invention relates to a control apparatus for an AC rotary machine and a control method for an AC rotary machine, wherein the AC rotary machine (for example, an AC electric motor) is used as a drive source, and the AC rotary machine is controlled by an inverter.

BACKGROUND ART

In a case where an AC electric motor is used as a drive source and where the AC electric motor is controlled by an inverter, regenerative energy cannot be consumed, and a DC voltage rises, if a load which consumes the regenerative energy does not exist on a power source side (that is, an overhead line side) in a regeneration mode.

Especially in case of an electric train, usually the electric train being braked converts the inertial energy of a vehicle into electric energy and restores the regenerative energy to an overhead line (that is, a power source).

In this case, it is indispensable that the power source side has a regenerativity, and that another electric train being accelerated as acts as a regenerative load exists on the power source side.

Here, in a case where the regenerative energy of the electric train in the regeneration mode is greater than energy which is consumed by the electric train being accelerated, the voltage of the overhead line or the voltage of a filter capacitor disposed at a stage preceding the inverter increases, and a protective function is sometimes actuated by an overvoltage.

A method for improving this problem is ordinarily such that the regenerative energy is fined to lower a braking force based on an electric brake, and that a lowered component is compensated by a mechanical brake.

In this case, a brake shoe wears off due to the operation of the mechanical brake, and hence, the maintenance of the brake shoe needs to be performed in a certain fixed period.

Besides, in JP-A-2002-95299 (Patent Document 1), there is stated a drive control apparatus for an electric train, having an inverter which receives feed of electric power through an overhead line and which regenerates electric power through the overhead line during a brake operation, and an induction motor which is driven by the inverter; comprising detection means for detecting a load state of an overhead line side, and current proportion adjustment means for adjusting a proportion of a magnitude of a torque current to a magnitude of an excitation current of the induction motor so that a loss in a secondary resistance of the induction motor may increase, in a case where a load of the overhead line side during a regenerative operation is a light load.
Patent Document 1: JP-A-2002-95299

DISCLOSURE OF THE INVENTION

Problems that the Invention is to Solve

In the drive control apparatus for an electric train as disclosed in Patent Document 1 (JP-A-2002-95299), the ratio of the magnitude of the torque current to the magnitude of the excitation current of the induction motor is adjusted in accordance with the detection result of the load state of the overhead line side. Accordingly, when the magnitude of the excitation current changes, also the magnitude of the torque current needs to be changed.

When the magnitude of the excitation current changes greatly, also the magnitude of the torque current needs to be changed greatly. In this case, the change of the torque current relative to the change of the excitation current is delayed, and there has been the problem that the drive control of the induction motor becomes unstable, or that the adjustment by the current proportion adjustment means becomes difficult.

Besides, in the drive control apparatus for an electric train as disclosed in Patent Document 1, a case where the power source side becomes no load temporarily as in passing through a dead section (that is, a no-power-feed section in which the overhead line is not fed with electric power) is supposed, but a case where the no-load state in which any regenerative load does not exist on the power source side at all continues is not supposed, and there has been the problem that the AC electric motor cannot be controlled in the case of the continuation of the no-load state.

This invention has been made in order to solve the problems as stated above, and it has for its object to provide a control apparatus for an AC rotary machine and a control method for an AC rotary machine, according to which even in a case where a no-load state in which any regenerative load does not exist on a power source side at all continues, the secondary magnetic flux command of the AC rotary machine (for example, an AC electric motor) can be calculated, and regenerative energy can be consumed at an optimal point without altering a torque which is generated by the AC electric motor.

Means for Solving the Problems

A control apparatus for an AC rotary machine according to the present invention consists in a control apparatus for an AC rotary machine, wherein the AC rotary machine is controlled on the basis of a secondary-magnetic-flux command value, comprising a variable-voltage variable-frequency inverter which converts a DC into an AC of any desired frequency, and which exchanges electric power between it and the AC rotary machine; voltage detection means for detecting voltage information of a DC side of the variable-voltage variable-frequency inverter; current detection means for detecting current information items of an AC side of the variable-voltage variable-frequency inverter; inverter-electric-power command means for determining an inverter-electric-power command value which is a command value of the electric power to be converted by the variable-voltage variable-frequency inverter, in accordance with the voltage information which the voltage detection means detects; actual-inverter-electric-power calculation means for calculating an actual inverter-electric-power value which is the electric power converted by the variable-voltage variable-frequency inverter, on the basis of the current information items which the current detection means detect; secondary-magnetic-flux command calculation means for calculating the secondary-magnetic-flux command value for the AC rotary machine, on the basis of a difference between the inverter-electric-power command value and the actual inverter-electric-power value; predetermined-secondary-magnetic-flux command means for outputting a predetermined secondary-magnetic-flux command value for the AC rotary machine; and secondary-magnetic-flux command changeover means for selecting either of the secondary-magnetic-flux command value from the secondary-magnetic-flux command calculation means and the predetermined secondary-magnetic-flux command value from the predetermined-secondary-magnetic-flux command means, as the secondary-magnetic-flux command value which is used for controlling the AC rotary machine through the variable-voltage variable-frequency inverter.

Besides, a control method for an AC rotary machine according to the present invention consists in a control method for an AC rotary machine, wherein the AC rotary machine is controlled on the basis of a secondary-magnetic-flux command value, comprising a voltage detection step of detecting voltage information of a DC side of a variable-voltage variable-frequency inverter which exchanges electric power between it and the AC rotary machine; a current detection step of detecting current information items of an AC side of the variable-voltage variable-frequency inverter; an inverter-electric-power command step of determining an inverter-electric-power command value which is a command value of the electric power to be converted by the variable-voltage variable-frequency inverter, in accordance with the voltage information which is detected at the voltage detection step; an actual-inverter-electric-power calculation step of calculating an actual inverter-electric-power value which is the electric power converted by the variable-voltage variable-frequency inverter, on the basis of the current information items which are detected at the current detection step; a secondary-magnetic-flux command calculation step of calculating the secondary-magnetic-flux command value for the AC rotary machine, on the basis of a difference between the inverter-electric-power command value and the actual inverter-electric-power value; a predetermined-secondary-magnetic-flux command step of outputting a predetermined secondary-magnetic-flux command value for the AC rotary machine; and a secondary-magnetic-flux command changeover step of selecting either of the secondary-magnetic-flux command value at the secondary-magnetic-flux command calculation step and the predetermined secondary-magnetic-flux command value at the predetermined-secondary-magnetic-flux command step, as the secondary-magnetic-flux command value which is used for controlling the AC rotary machine through the variable-voltage variable-frequency inverter.

Advantage of the Invention

According to the present invention, it is possible to provide a control apparatus for an AC rotary machine and a control method for an AC rotary machine, in which even in a case where a no-load state where any regenerative load does not exist on a power source side at all continues, the secondary-magnetic-flux command of the AC rotary machine (for example, an AC electric motor) can be calculated, and regenerative energy can be consumed at an optimal point without altering a torque that the AC electric motor generates.

DESCRIPTION OF REFERENCE NUMERALS

1 variable-voltage variable-frequency inverter (VVVF inverter), 2 AC electric motor, 3 current detector, 4 capacitor, 5 speed detector, 6 inductance, 7 overhead line, 8 phase calculator, 9 inverter frequency calculator, 10 slip frequency command calculator, 11 d-axis current command calculator, 12 q-axis current command calculator, 13 voltage command calculator, 14 dq-axis/three-phase converter, 15 three-phase/dq-axis converter, 16 voltage detector, 17, 25, 33, 35, 37 command secondary-magnetic-flux calculation/changeover means, 18, 32, 38 secondary-magnetic-flux command calculation unit, 19 actual-inverter-electric-power calculation unit, 20 inverter-electric-power command unit, 21 subtractor (inverter-electric-power deviation calculation means), 22, 40 electric-power control unit, 23 predetermined-secondary-magnetic-flux command unit, 24, 26, 34, 36 secondary-magnetic-flux command changeover unit, 27 inverter-electric-power command unit in powering mode, 28 changeover switch, 29 sign calculation unit, 30 logical product circuit, 31 logical sum circuit, 39 zero-inverter-electric-power command unit, 50 inverter-electric-power command unit in regeneration mode

BEST MODE FOR CARRYING OUT THE INVENTION

Now, embodiments of the present invention will be described in conjunction with the drawings.

Throughout the drawings, identical numerals and signs represent identical or equivalent parts.

By the way, in the individual embodiments to be described below, a case where an AC rotary machine being a controlled system is an AC electric motor shall be described as an example.

Embodiment 1

Figure 1:
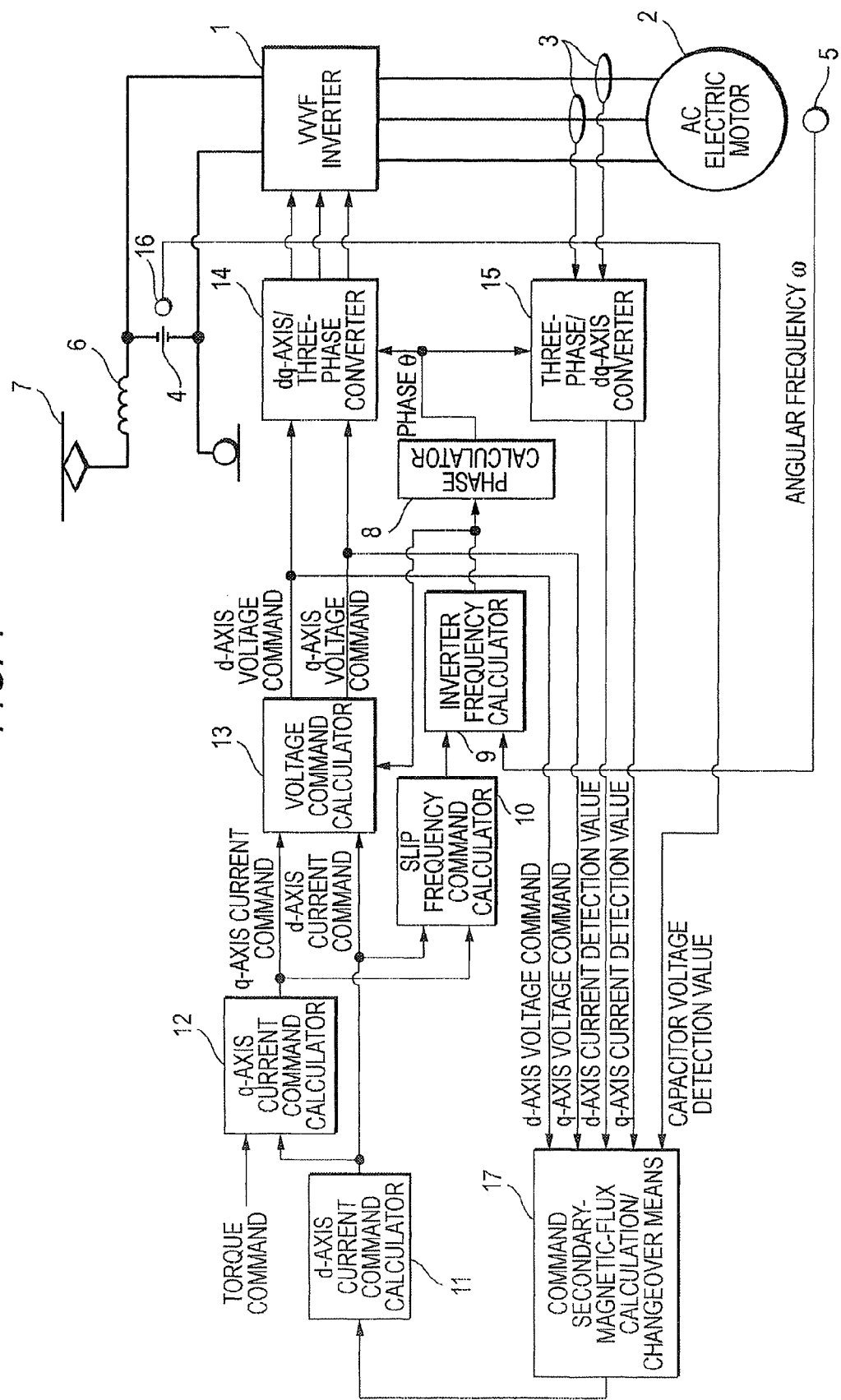
FIG. 1 It is a diagram showing the configuration of a control apparatus for an AC electric motor according to Embodiment 1.

FIG. 1 is a diagram showing the configuration of a control apparatus for an AC electric motor according to Embodiment 1 of the present invention.

A variable-voltage variable-frequency inverter (hereinbelow, also abbreviated to "VVVF inverter") 1 which converts a DC voltage into an AC voltage of any desired frequency, applies voltages of three phases to an AC electric motor 2 being an induction electric motor. Current detectors 3 detect phase currents iu and iv which are generated in the AC electric motor 2.

By the way, in FIG. 1, CTs or the likes which detect currents flowing through connections for connecting the variable-voltage variable-frequency inverter 1 and the AC electric motor 2 are shown as the current detectors 3, but the phase currents may well be detected using currents flowing within the variable-voltage variable-frequency inverter 1, such as bus currents, by employing another known technique.

Since the relation of iu+iv+iw=0 holds, the current of the w-phase can be evaluated from the detection currents of the two phases of the u-phase and v-phase.

Besides, a voltage detector 16 detects a DC voltage across the terminals of a capacitor 4 as is the input voltage of the variable-voltage variable-frequency inverter 1.

As is known, when three-phase voltages or three-phase currents are coordinate-transformed into two rotating orthogonal axes, a control coordinate axis is required. The phase of the control coordinate axis is denoted by $\theta$.

The phase $\theta$ is a value which is obtained by integrating an inverter frequency by a phase calculator 8.

A three-phase/dq-axis converter 15 coordinate-transforms the phase currents iu, iv and iw obtained from the current detectors 3, into a d-axis current id and a q-axis current iq on the two rotating orthogonal axes (d-q axes) of the phase $\theta$ (hereinbelow, termed "rotating two-axis coordinates").

Incidentally, the "d-axis current" signifies a torque current, and the "q-axis current" signifies an excitation current.

The phase calculator 8 integrates the inverter frequency being the output of an inverter frequency calculator 9, and it outputs the phase $\theta$ to a three-phase/dq-axis converter 15 and a dq-axis/three-phase converter 14.

The dq-axis/three-phase converter 14 converts a d-axis voltage command and a q-axis voltage command into three-phase voltage commands on the basis of the phase $\theta$ obtained from the phase calculator 8, and it outputs the three-phase voltage commands to the variable-voltage variable-frequency inverter 1.

A d-axis current command calculator 11 calculates a value which is obtained in such a way that, as indicated by Formula (1) below, a secondary magnetic flux command value $\phi^*$ being the output of command secondary-magnetic-flux calculation/changeover means 17 is divided by a mutual inductance M being the motor constant of the AC electric motor 2, and it outputs the value as a d-axis current command id* to a slip frequency command calculator 10, a q-axis current command calculator 12 and a voltage command calculator 13.

$$id^* = \phi^*/M \quad (1)$$

The q-axis current command calculator 12 executes a calculation from a torque command $\tau^*$, the d-axis current command id* which is the output of the d-axis current command calculator 11, and the mutual inductance M, a secondary inductance Lr and the number p of pole pairs as are the motor constants of the AC electric motor 2, as indicated by Formula (2) below, and it outputs the result as a q-axis current command iq* to the slip frequency command calculator 10 and the voltage command calculator 13.

$$iq^* = (\tau^*/\phi^*) \times (1/p) \times (Lr/M2) \quad (2)$$

The slip frequency command calculator 10 executes a calculation from the d-axis current command id*, the q-axis current command iq*, and the secondary inductance Lr and a secondary resistance Rr which are the motor constants of the AC electric motor 2, as indicated by Formula (3) below, and it outputs the result as a slip frequency command $\omega s^*$ to the inverter frequency calculator 9.

$$\omega s^* = (iq^*/id^*) \times (Rr/Lr) \quad (3)$$

The inverter frequency calculator 9 calculates a value obtained in such a way that an angular frequency $\omega$ detected by a speed detector 5 for detecting the revolution number (speed) of the AC electric motor 2 and the slip frequency command $\omega s^*$ outputted by the slip frequency command calculator 10 are added as indicated by Formula (4) below, and it outputs the result as the inverter frequency $\omega$inv to the phase calculator 8 and the voltage command calculator 13.

$$\omega inv = \omega + \omega s^* \quad (4)$$

The voltage command calculator 13 executes calculations from the inverter frequency $\omega$inv, the q-axis current command iq*, the d-axis current command id*, and a primary inductance Ls and a primary resistance Rs which are the motor constants of the AC electric motor 2, as indicated by Formula (5) below, and it outputs the results as the d-axis voltage command vd* and the q-axis voltage command vq* to the dq-axis/three-phase converter 14.

$$vd^* = Rs \times id^* - \omega inv \times \sigma \times Ls \times iq^* \quad vq^* = Rs \times iq^* + \omega inv \times Ls \times id^* \quad (5)$$

Incidentally, $\sigma$ in Formula (5) is defined as indicated in Formula (6) below, by the primary inductance Ls, secondary inductance Lr and mutual inductance M which are the motor constants of the AC electric motor 2.

$$\sigma = 1 - M^2/(Lr \times Ls) \quad (6)$$

Figure 2:
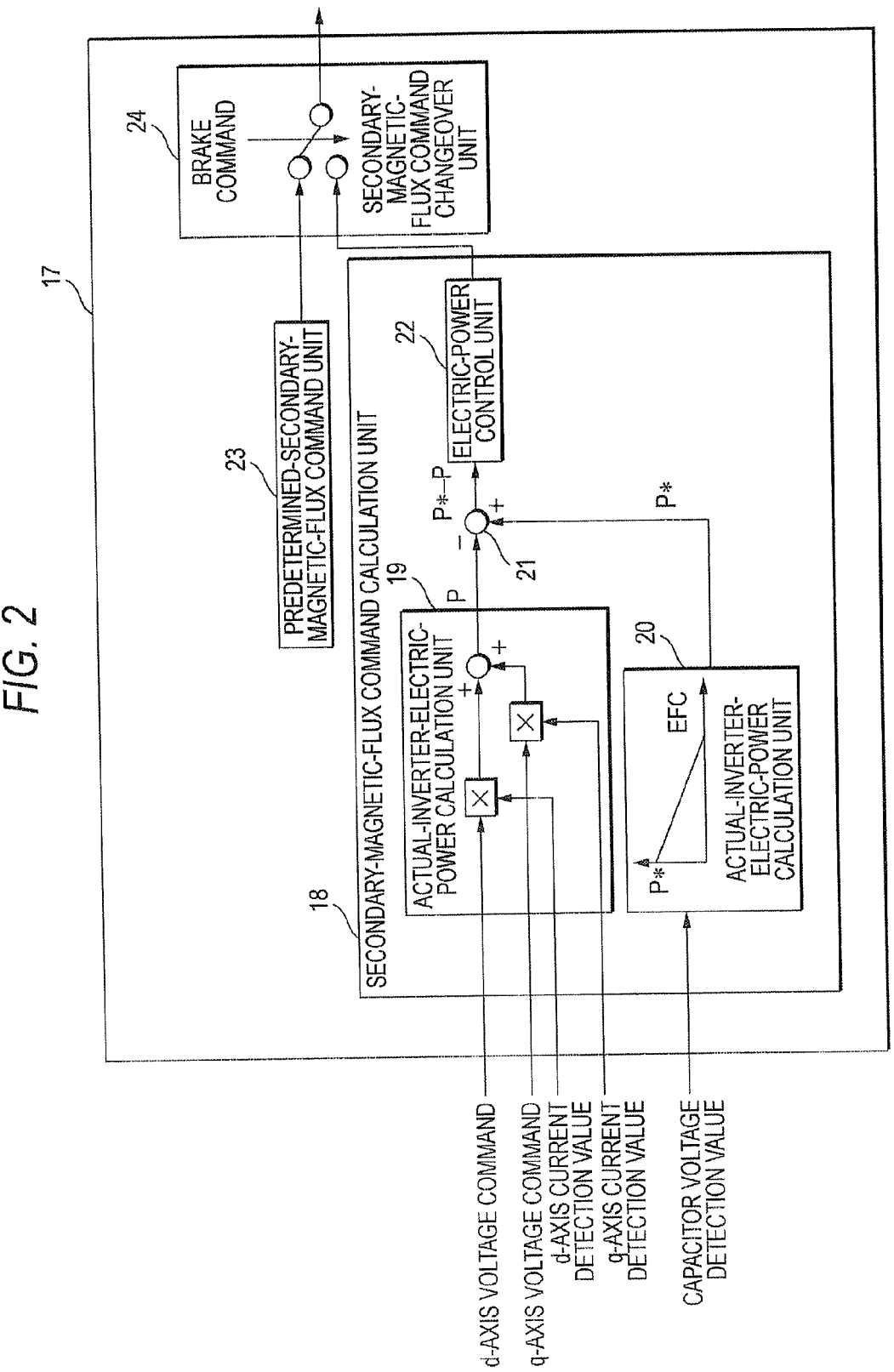
FIG. 2 It is a block diagram showing the practicable configuration of command secondary-magnetic-flux calculation/changeover means in Embodiment 1.

FIG. 2 is a block diagram showing the practicable configuration of the command secondary-magnetic-flux calculation/changeover means 17.

As shown in FIG. 2, the command secondary-magnetic-flux calculation/changeover means 17 is configured of a secondary-magnetic-flux command calculation unit 18, a predetermined-secondary-magnetic-flux command unit 23 which gives a predetermined secondary-magnetic-flux command, and a secondary-magnetic-flux command changeover unit 24 which can change-over the output (command value) from the predetermined-secondary-magnetic-flux command unit 23 and an output (command value) from the secondary-magnetic-flux command calculation unit 18.

Besides, the secondary-magnetic-flux command calculation unit 18 is configured of an actual-inverter-electric-power calculation unit 19, an inverter-electric-power command unit 20, a subtractor 21, and an electric-power control unit 22.

Incidentally, the case where the secondary-magnetic-flux command calculation unit 18 is configured of the actual-inverter-electric-power calculation unit 19, inverter-electric-power command unit 20, subtractor 21, and electric-power control unit 22 is shown in FIG. 2, but the actual-inverter-electric-power calculation unit 19 and the inverter-electric-power command unit 20 need not be included within the secondary-magnetic-flux command calculation unit 18.

That is, the command secondary-magnetic-flux calculation/changeover means 17 may well be configured of the actual-inverter-electric-power calculation unit 19, the inverter-electric-power command unit 20, the secondary-magnetic-flux command calculation unit 18 which consists of the subtractor 21 and the electric-power control unit 22, the predetermined-secondary-magnetic-flux command unit 23 which gives the predetermined secondary magnetic flux command, and the secondary-magnetic-flux command changeover unit 24 which can change-over the output (command value) from the predetermined-secondary-magnetic-flux command unit 23 and the output (command value) from the secondary-magnetic-flux command calculation unit 18.

In this case, the secondary-magnetic-flux command calculation unit 18 calculates a secondary-magnetic-flux command value for the AC electric motor 2, on the basis of the difference between an inverter electric-power command value from the inverter-electric-power command unit 20 and an actual inverter electric-power value from the actual-inverter-electric-power calculation unit 19.

As indicated by Formula (7) below, the actual-inverter-electric-power calculation unit 19 calculates actual inverter electric-power P from the d-axis voltage command vd*, q-axis voltage command vq*, d-axis current id and q-axis current iq.

$$P=vd^{*}\times id+vq^{*}\times iq \quad (7)$$

Incidentally, as is known, the actual inverter electric-power can also be computed as the product between a capacitor voltage detection value and an inverter input current.

The inverter-electric-power command unit 20 gives an inverter electric-power command P* by table data or the like, in accordance with the capacitor voltage detection value EFC detected by the voltage detector 16 (refer to FIG. 1).

In Embodiment 1, the inverter electric-power command P* is set so as to become small with the rise of a capacitor voltage.

In the regeneration mode of the VVVF inverter 1, the voltage of the capacitor 4 rises when the load of an overhead line 7 (refer to FIG. 1) is low.

If the electric power of the VVVF inverter 1 can be limited by the capacitor voltage in adaptation to the function, the electric power which the VVVF inverter 1 generates can be limited without altering a torque which the AC electric motor generates.

The subtractor 21 calculates an inverter electric-power deviation in such a way that the actual inverter electric-power P being the output of the actual-inverter-electric-power calculation unit 19 is subtracted from the inverter electric-power command P* being the output of the inverter-electric-power command unit 20. That is, the subtractor 21 has the function of inverter electric-power deviation calculation means.

The electric-power control unit 22 amplifies the deviation between the inverter electric-power command P* and the actual inverter electric-power P, and outputs the amplified deviation to the secondary-magnetic-flux command changeover unit 24.

Owing to the use of such an electric-power control unit 22, a function is effected so as to be capable of calculating the secondary-magnetic-flux command in order that the inverter electric-power command and the actual inverter electric-power may agree.

Incidentally, the predetermined-secondary-magnetic-flux command unit 23 gives the predetermined secondary-magnetic-flux command.

The secondary-magnetic-flux command changeover unit 24 can change-over the secondary magnetic flux command from the predetermined-secondary-magnetic-flux command unit 23 and the secondary magnetic flux command from the secondary-magnetic-flux command calculation unit 18.

In Embodiment 1, in the powering mode of the VVVF inverter 1, the secondary-magnetic-flux command changeover unit 24 selects the predetermined-secondary-magnetic-flux command unit 23 which can give the predetermined secondary-magnetic-flux command.

Besides, in the regeneration mode of the VVVF inverter 1, the secondary-magnetic-flux command changeover unit 24 selects the output (command value) from the secondary-magnetic-flux command calculation unit 18 which can give the value obtained by calculating the secondary-magnetic-flux command based on the inverter electric-power.

Incidentally, "powering" signifies a state where a vehicle travels while being accelerated by power, and "regeneration" signifies a state where the kinetic energy of the vehicle (electric train) being traveling is converted into electric energy so as to restore the electric energy to the overhead line.

In this manner, the output (command value) from the secondary-magnetic-flux command calculation unit 18 is selected in the regeneration mode, thereby to calculate that "optimal value of the secondary magnetic flux command" at which the electric power to be generated by the inverter can be controlled in accordance with the capacitor voltage, and the torque to be generated by the AC electric motor 2 is not altered.

Thus, a regeneration quantity which flows through the overhead line of the VVVF inverter 1 can be limited in adaptation to the load of the overhead line (namely, the load of a power source), to bring forth the advantage that regenerative energy can be consumed at an optimal point without altering the torque which the AC electric motor generates.

Besides, the inverter-electric-power command unit 20 is supposed as giving the electric power command by the table data whose input is the capacitor voltage, but it may well give the electric power command by table data whose input is electric power information obtained by multiplying voltage information and current information, instead of the capacitor voltage. It is also allowed to employ a data table whose input is the current information of the overhead line.

As described above, the control apparatus for the AC electric motor (AC rotary machine) according to this embodiment consists in a control apparatus for an AC electric motor, wherein the AC electric motor 2 is controlled on the basis of a secondary-magnetic-flux command value, comprising a variable-voltage variable-frequency inverter 1 which converts a DC into an AC of any desired frequency and which exchanges electric power between it and the AC electric motor, voltage detection means (a voltage detector 16) for detecting voltage information of a DC side of the variable-voltage variable-frequency inverter 1, current detection means (current detectors 3) for detecting current information of an AC side of the variable-voltage variable-frequency inverter 1, inverter-electric-power command means (an inverter-electric-power command unit 20) for determining an inverter-electric-power command value which is a command value of electric power to be converted by the variable-voltage variable-frequency inverter 1, in accordance with the voltage information detected by the voltage detection means (voltage detector 16), actual-inverter-electric-power calculation means (an actual-inverter-electric-power calculation unit 19) for calculating an actual inverter electric-power value which is the electric power to be converted by the variable-voltage variable-frequency inverter 1, on the basis of the current information detected by the current detection means (current detectors 3), secondary-magnetic-flux command calculation means (a secondary-magnetic-flux command calculation unit 18) for calculating the secondary-magnetic-flux command value for the AC rotary machine (AC electric motor 2), on the basis of a difference between the inverter-electric-power command value and the actual inverter electric-power value, predetermined-secondary-magnetic-flux command means (a predetermined-secondary-magnetic-flux command unit 23) for outputting a predetermined secondary-magnetic-flux command value for the AC electric motor 2, and secondary-magnetic-flux command changeover means (a secondary-magnetic-flux command changeover unit 24) for selecting either of the secondary-magnetic-flux command value from the secondary-magnetic-flux command calculation means (secondary-magnetic-flux command calculation unit 18) and the predetermined secondary-magnetic-flux command value from the predetermined-secondary-magnetic-flux command means (predetermined-secondary-magnetic-flux command unit 23), as the secondary-magnetic-flux command value which is used for controlling the AC rotary machine (AC electric motor 2) through the variable-voltage variable-frequency inverter 1.

Besides, the control method for the AC electric motor (AC rotary machine) according to this embodiment consists in a control method for an AC electric motor, wherein the AC electric motor is controlled on the basis of a secondary-magnetic-flux command value, comprising a voltage detection step of detecting voltage information of a DC side of a variable-voltage variable-frequency inverter which exchanges electric power between it and the AC electric motor, a current detection step of detecting current information of an AC side of the variable-voltage variable-frequency inverter, an inverter-electric-power command step of determining an inverter-electric-power command value which is a command value of electric power to be converted by the variable-voltage variable-frequency inverter, in accordance with the voltage information detected at the voltage detection step, an actual-inverter-electric-power calculation step of calculating an actual inverter electric-power value which is the electric power to be converted by the variable-voltage variable-frequency inverter, on the basis of the current information detected at the current detection step, a secondary-magnetic-flux command calculation step of calculating the secondary-magnetic-flux command value for the AC electric motor, on the basis of a difference between the inverter-electric-power command value and the actual inverter electric-power value, a predetermined-secondary-magnetic-flux command step of outputting a predetermined secondary-magnetic-flux command value for the AC electric motor, and a secondary-magnetic-flux command changeover step of selecting either of the secondary-magnetic-flux command value at the secondary-magnetic-flux command calculation step and the predetermined secondary-magnetic-flux command value at the predetermined-secondary-magnetic-flux command step, as the secondary-magnetic-flux command value which is used for controlling the AC electric motor through the variable-voltage variable-frequency inverter.

As a result, in accordance with the control apparatus for the AC electric motor or the control method for the AC electric motor according to this embodiment, it is possible to realize a control apparatus for an AC electric motor and a control method for an AC electric motor, in which even in a case where a no-load state in which any regenerative load does not exist on a power source side at all continues, the secondary-magnetic-flux command of the AC electric motor can be calculated, and regenerative energy can be consumed at an optimal point without altering a torque which is generated by the AC electric motor.

Further, the secondary-magnetic-flux command changeover means (secondary-magnetic-flux command changeover unit 24) of the control apparatus for the AC electric motor according to this embodiment selects the predetermined secondary-magnetic-flux command value from the predetermined-secondary-magnetic-flux command means (predetermined-secondary-magnetic-flux command unit 23) in the powering operation mode of the variable-voltage variable-frequency inverter 1, whereas it selects the secondary-magnetic-flux command value from the secondary-magnetic-flux command calculation means (secondary-magnetic-flux command calculation unit 18) in the regenerative operation mode of the variable-voltage variable-frequency inverter 1.

Thus, it is permitted to select the command value from the secondary-magnetic-flux command calculation means (secondary-magnetic-flux command calculation unit 18) capable of controlling the electric power which the variable-voltage variable-frequency inverter 1 generates during the regeneration.

Embodiment 2

Figure 3:
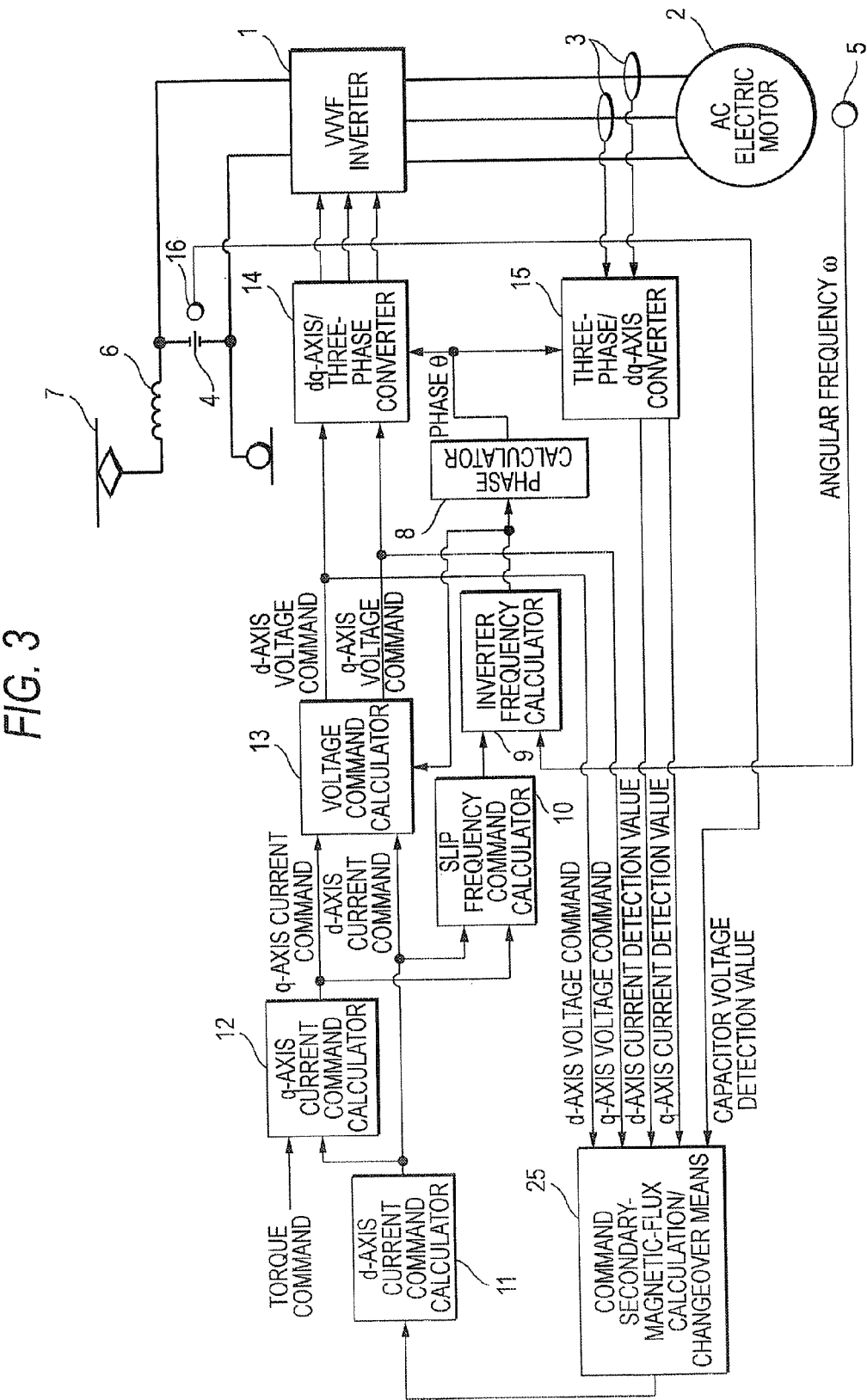
FIG. 3 It is a diagram showing the configuration of a control apparatus for an AC electric motor according to Embodiment 2.

FIG. 3 is a block diagram showing the configuration of a control apparatus for an AC electric motor according to Embodiment 2.

In this embodiment, the configuration of command secondary-magnetic-flux calculation/changeover means 25 differs from that of the command secondary-magnetic-flux calculation/changeover means 17 in Embodiment 1 stated before.

Figure 4:
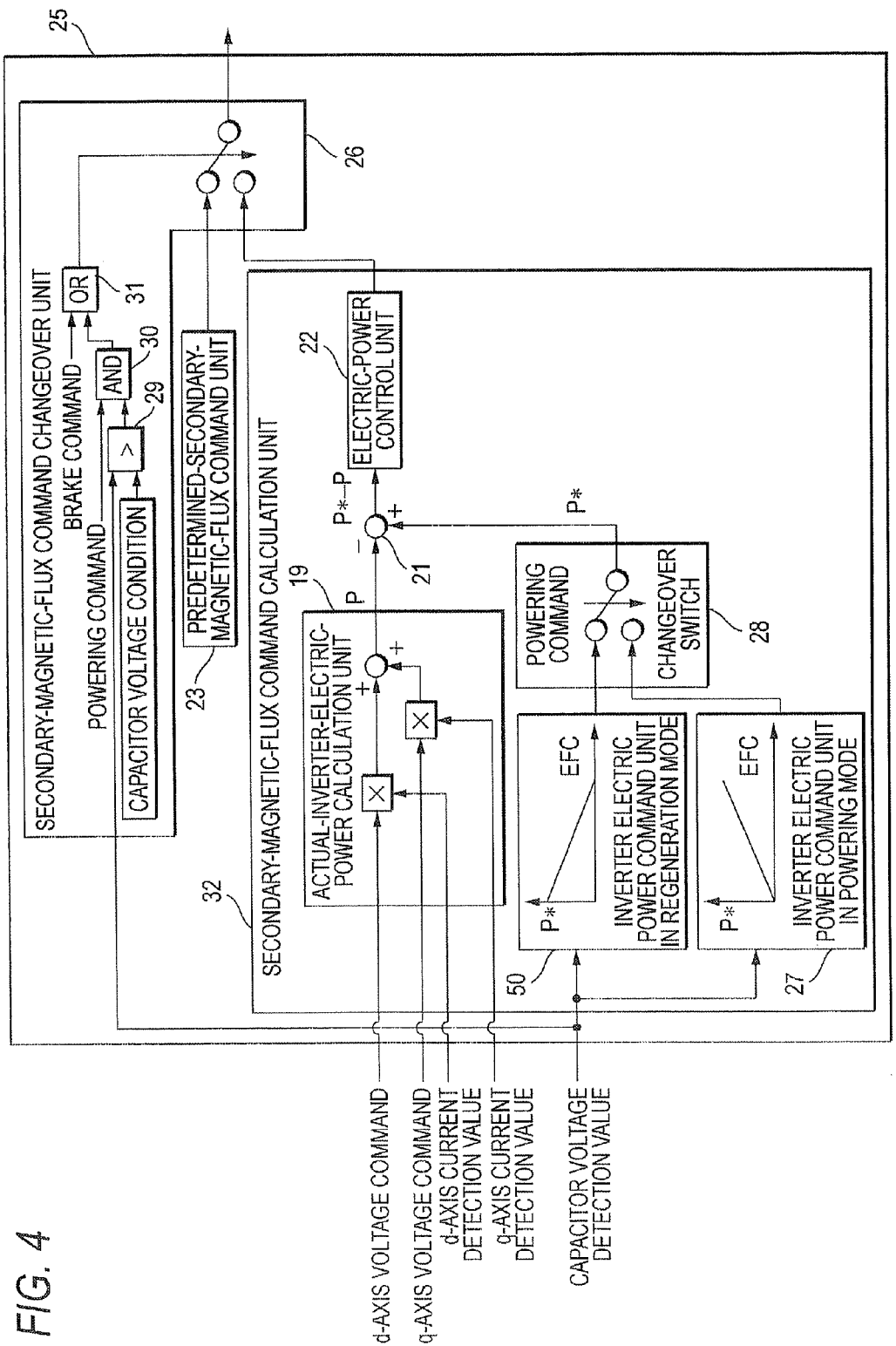
FIG. 4 It is a block diagram showing the practicable configuration of command secondary-magnetic-flux calculation/changeover means in Embodiment 2.

FIG. 4 is a block diagram showing the practicable configuration of the command secondary-magnetic-flux calculation/changeover means 25.

In Embodiment 1 stated before, during the regeneration, an output (command value) from the secondary-magnetic-flux command calculation unit 18 has been selected by the secondary-magnetic-flux command changeover unit 24 in compliance with a brake command.

In contrast, in Embodiment 2, as shown in FIG. 4, a secondary-magnetic-flux command changeover unit 26 is adopted instead of the secondary-magnetic-flux command changeover unit 24, whereby a condition based on a capacitor voltage is set in the powering mode, and an output (command value) from a secondary-magnetic-flux command calculation unit 32 is selected even in the powering mode.

In this way, when the capacitor voltage has risen in the powering mode, electric power which the VVVF inverter 1 generates can be controlled, and hence, the VVVF inverter 1 is permitted to further consume electric power in the powering mode, to bring forth the advantage that this VVVF inverter 1 becomes the regenerative load of the power source.

When the capacitor voltage exceeds a predetermined value in the powering mode of the VVVF inverter 1, the secondary-magnetic-flux command changeover unit 26 can select the output from the secondary-magnetic-flux command calculation unit 32 by a sign calculation unit 29 and a logical product circuit (AND circuit) 30.

In a case where the power source has few powering vehicles acting as regenerative loads, the capacitor voltage rises during the powering.

When the capacitor voltage rises, an inverter electric-power command needs to be enlarged, and hence, there is disposed an inverter-electric-power command unit 27 in the powering mode, in which the inverter electric-power command P* enlarges in accordance with a capacitor-voltage detection value EFC as shown in FIG. 4.

Besides, a changeover switch 28 is disposed so that an inverter-electric-power command unit 50 in the regeneration mode and the inverter-electric-power command unit 27 in the powering mode can be changed-over by a powering command.

Incidentally, an operation during the regeneration is the same as in Embodiment 1.

Thus, optimal inverter-electric-power commands can be given in the regeneration mode and the powering mode.

Incidentally, as stated in Embodiment 1, the secondary-magnetic-flux command calculation unit 32 is shown as being configured of the actual-inverter-electric-power calculation unit 19, the inverter-electric-power command unit 27 in the powering mode, the inverter-electric-power command unit 50 in the regeneration mode, the changeover switch 28, the subtractor 21 and the electric-power control unit 22, but the actual-inverter-electric-power calculation unit 19, the inverter-electric-power command unit 27 in the powering mode, the inverter-electric-power command unit 50 in the regeneration mode and the changeover switch 28 need not be included within the secondary-magnetic-flux command calculation unit 32.

That is, the command secondary-magnetic-flux calculation/changeover means 25 may well be configured of the actual-inverter-electric-power calculation unit 19, the inverter-electric-power command unit 27 in the powering mode, the inverter-electric-power command unit 50 in the regeneration mode, the changeover switch 28, the secondary-magnetic-flux command calculation unit 32 which consists of the subtractor 21 and the electric-power control unit 22, the predetermined-secondary-magnetic-flux command unit 23 which gives a predetermined secondary magnetic flux command, and the secondary-magnetic-flux command changeover unit 26 which can change-over the output (command value) from the predetermined-secondary-magnetic-flux command unit 23 and the output (command value) from the secondary-magnetic-flux command calculation unit 32.

As described above, the secondary-magnetic-flux command changeover means (secondary-magnetic-flux command changeover unit 26) of the control apparatus for the AC electric motor according to this embodiment selects the predetermined secondary-magnetic-flux command value from the predetermined-secondary-magnetic-flux command means (predetermined-secondary-magnetic-flux command unit 23) or the secondary-magnetic-flux command value from the secondary-magnetic-flux command calculation means (secondary-magnetic-flux command calculation unit 32), in accordance with the voltage information of the variable-voltage variable-frequency inverter 1 when this variable-voltage variable-frequency inverter 1 is in the powering operation mode, and it selects the secondary-magnetic-flux command value from the secondary-magnetic-flux command calculation means (secondary-magnetic-flux command calculation unit 32), when the variable-voltage variable-frequency inverter 1 is in the regeneration operation mode.

Thus, according to this embodiment, it is permitted to control electric power which the variable-voltage variable-frequency inverter 1 generates when the capacitor voltage has risen in the powering mode, and the variable-voltage variable-frequency inverter 1 can further consume the electric power in the powering mode, to bring forth the advantage that the AC electric motor becomes the regenerative load of the power source.

Embodiment 3

Figure 5:
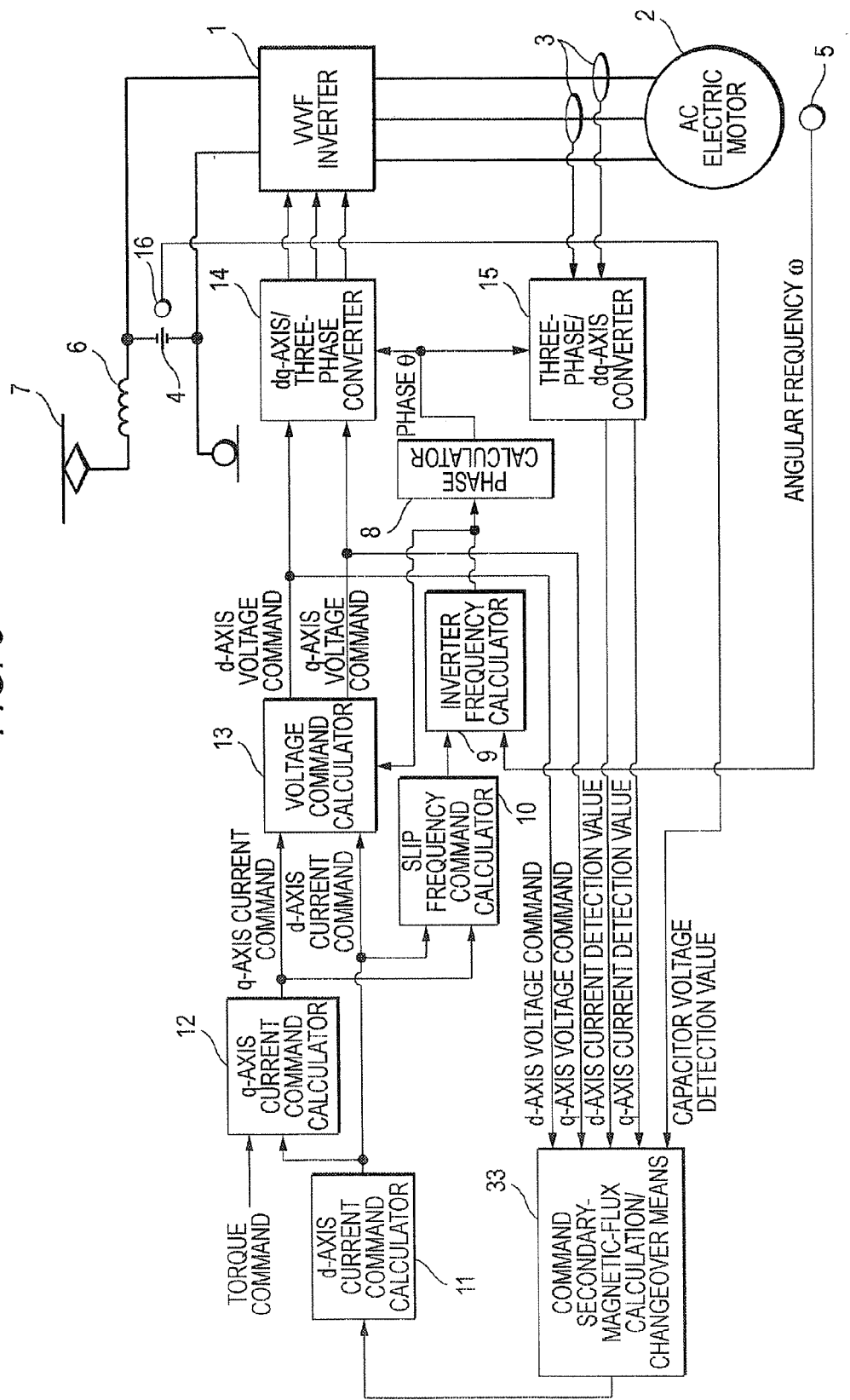
FIG. 5 It is a diagram showing the configuration of a control apparatus for an AC electric motor according to Embodiment 3.

FIG. 5 is a block diagram showing the configuration of a control apparatus for an AC electric motor according to Embodiment 3.

In this embodiment, the configuration of command secondary-magnetic-flux calculation/changeover means 33 differs from that of the command secondary-magnetic-flux calculation/changeover means 17 in Embodiment 1.

Figure 6:
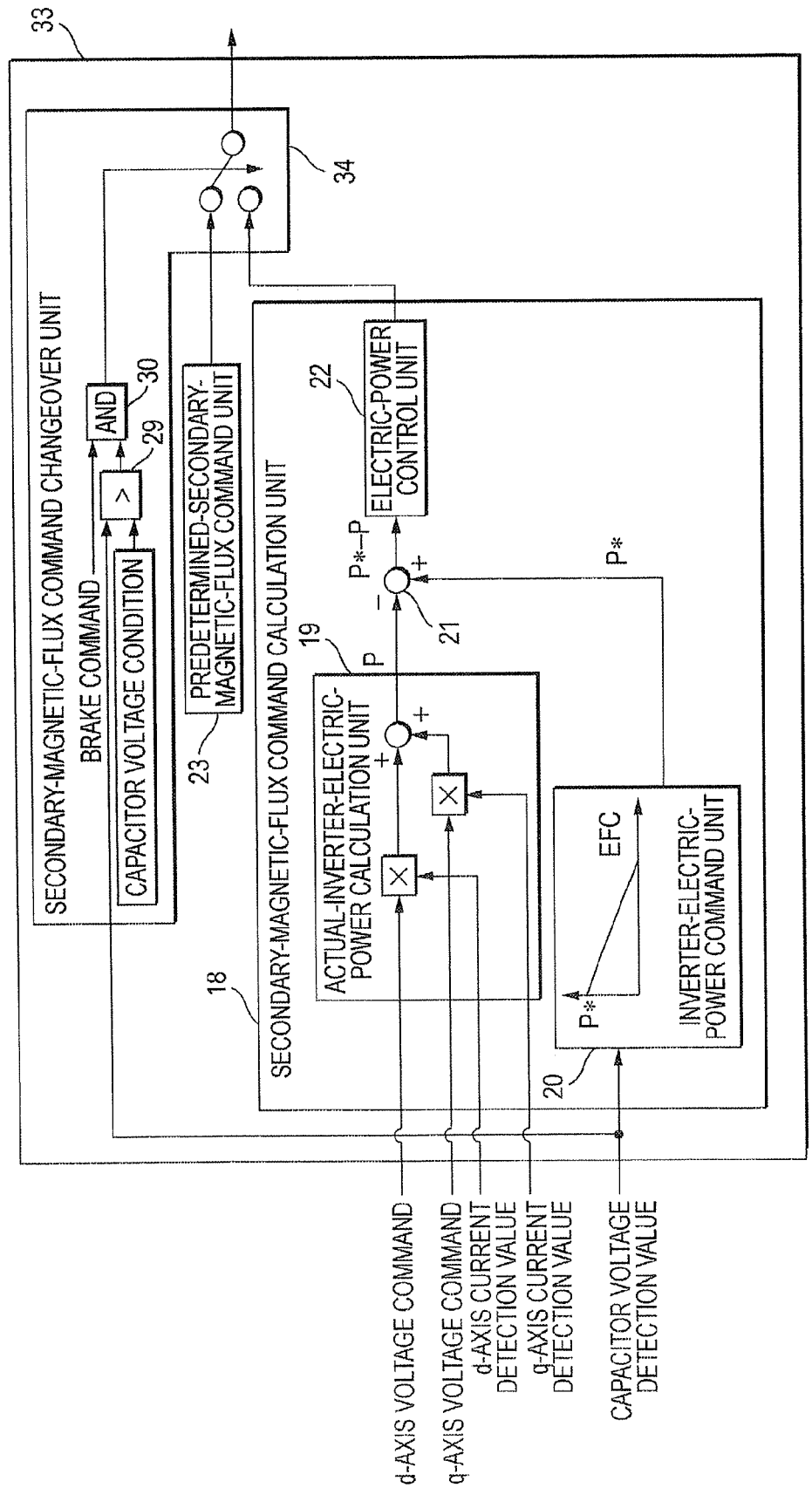
FIG. 6 It is a block diagram showing the practicable configuration of command secondary-magnetic-flux calculation/changeover means in Embodiment 3.

FIG. 6 is a block diagram showing the practicable configuration of the command secondary-magnetic-flux calculation/changeover means 33.

In Embodiment 1, during the regeneration, an output (command value) from the secondary-magnetic-flux command calculation unit 18 has been selected by a brake command.

In this embodiment, as shown in FIG. 6, a secondary-magnetic-flux command changeover unit 34 is adopted instead of the secondary-magnetic-flux command changeover unit 24, whereby a condition based on a capacitor voltage is set in the regeneration mode, and the output (command) from the secondary-magnetic-flux command calculation unit 18 is selected.

With such a configuration, when the capacitor voltage has risen in the regeneration mode, the secondary-magnetic-flux calculation unit 18 capable of controlling electric power which the VVVF inverter 1 generates can be selected.

Besides, except when the capacitor voltage has risen, a predetermined secondary-magnetic-flux command is given.

Thus, when regenerative loads have lessened during the regeneration, the secondary-magnetic-flux calculation unit is operated, and regenerative electric power can be efficiently restored to the power source side, to bring forth the advantage that an energy saving operation can be performed.

When the capacitor voltage becomes greater than a certain value, the secondary-magnetic-flux command changeover unit 34 can select the output (command value) from the secondary-magnetic-flux command calculation unit 18.

The subsequent operation is the same as in Embodiment 1.

Incidentally, as stated in Embodiment 1, the secondary-magnetic-flux command calculation unit 18 is shown as being configured of the actual-inverter-electric-power calculation unit 19, the inverter-electric-power command unit 20, the subtractor 21 and the electric-power control unit 22, but the actual-inverter-electric-power calculation unit 19 and the inverter-electric-power command unit 20 need not be included within the secondary-magnetic-flux command calculation unit 18.

That is, the command secondary-magnetic-flux calculation/changeover means 33 may well be configured of the actual-inverter-electric-power calculation unit 19, the inverter-electric-power command unit 20, the secondary-magnetic-flux command calculation unit 18 which consists of the subtractor 21 and the electric-power control unit 22, the predetermined-secondary-magnetic-flux command unit 23 which gives the predetermined secondary-magnetic-flux command, and the secondary-magnetic-flux command changeover unit 34 which can change-over the output (command value) from the predetermined-secondary-magnetic-flux command unit 23 and the output (command value) from the secondary-magnetic-flux command calculation unit 18.

As described above, the secondary-magnetic-flux command changeover unit 34 of the control apparatus for the AC electric motor according to this embodiment selects the predetermined secondary-magnetic-flux command value from the predetermined-secondary-magnetic-flux command means (predetermined-secondary-magnetic-flux command unit 23), when the variable-voltage variable-frequency inverter 1 is in the powering operation mode, and it selects the predetermined secondary-magnetic-flux command from the predetermined-secondary-magnetic-flux command means or the secondary-magnetic-flux command value from the secondary-magnetic-flux command calculation means, in accordance with the voltage information of the variable-voltage variable-frequency inverter, when the variable-voltage variable-frequency inverter is in the regeneration operation mode.

In this manner, in this embodiment, except when the capacitor voltage has risen, the predetermined secondary-magnetic-flux command value is given. Besides, even in the regeneration mode, the secondary-magnetic-flux command calculation unit 18 is operated when the regenerative loads have lessened.

Thus, the regenerative electric power can be efficiently restored to the power source side, and the energy saving operation is permitted.

Embodiment 4

Figure 7:
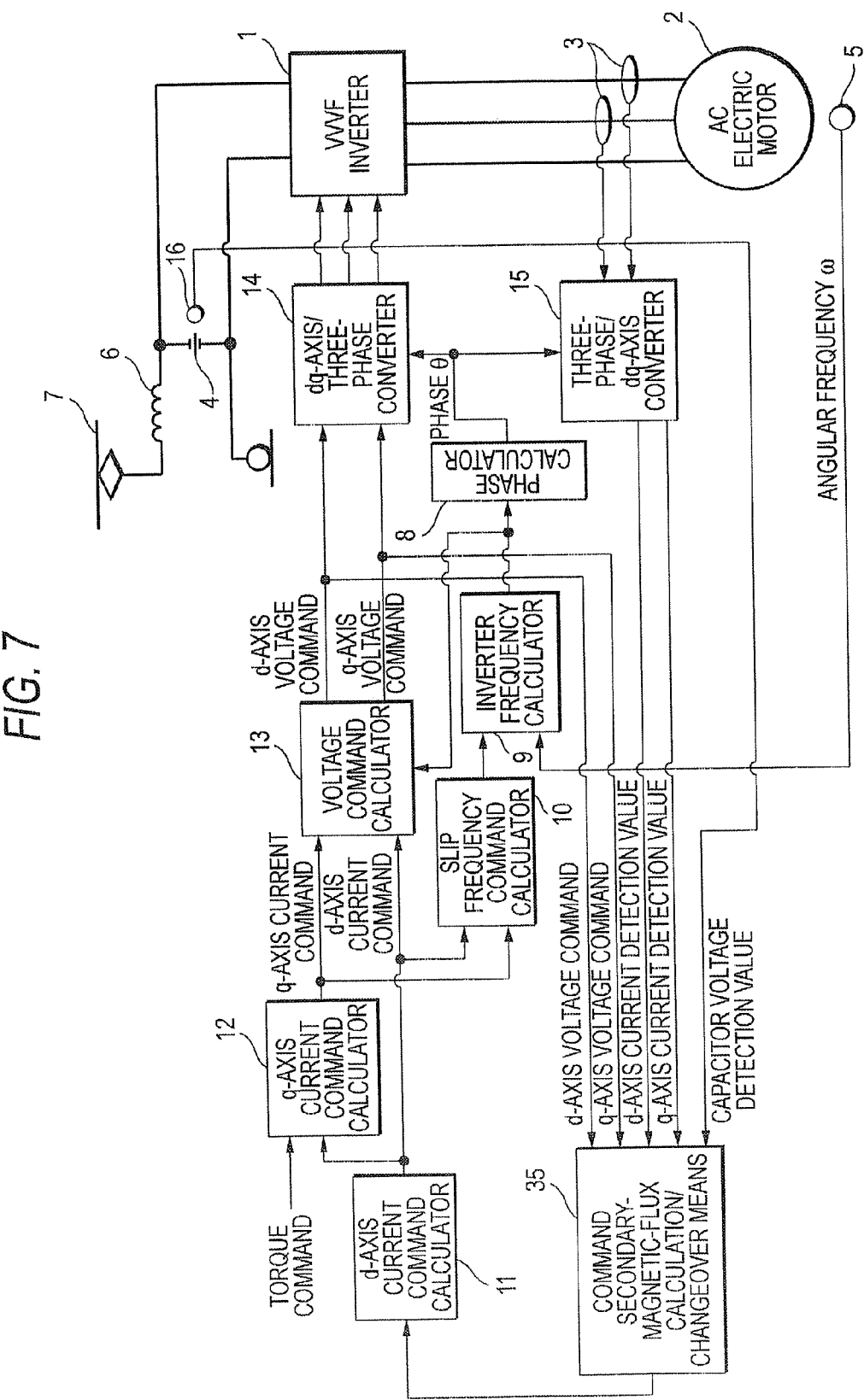
FIG. 7 It is a diagram showing the configuration of a control apparatus for an AC electric motor according to Embodiment 4.

FIG. 7 is a block diagram showing the configuration of a control apparatus for an AC electric motor according to Embodiment 4.

In this embodiment, the configuration of command secondary-magnetic-flux calculation/changeover means 35 differs from that of the command secondary-magnetic-flux calculation/changeover means in Embodiment 2 or Embodiment 3.

Figure 8:
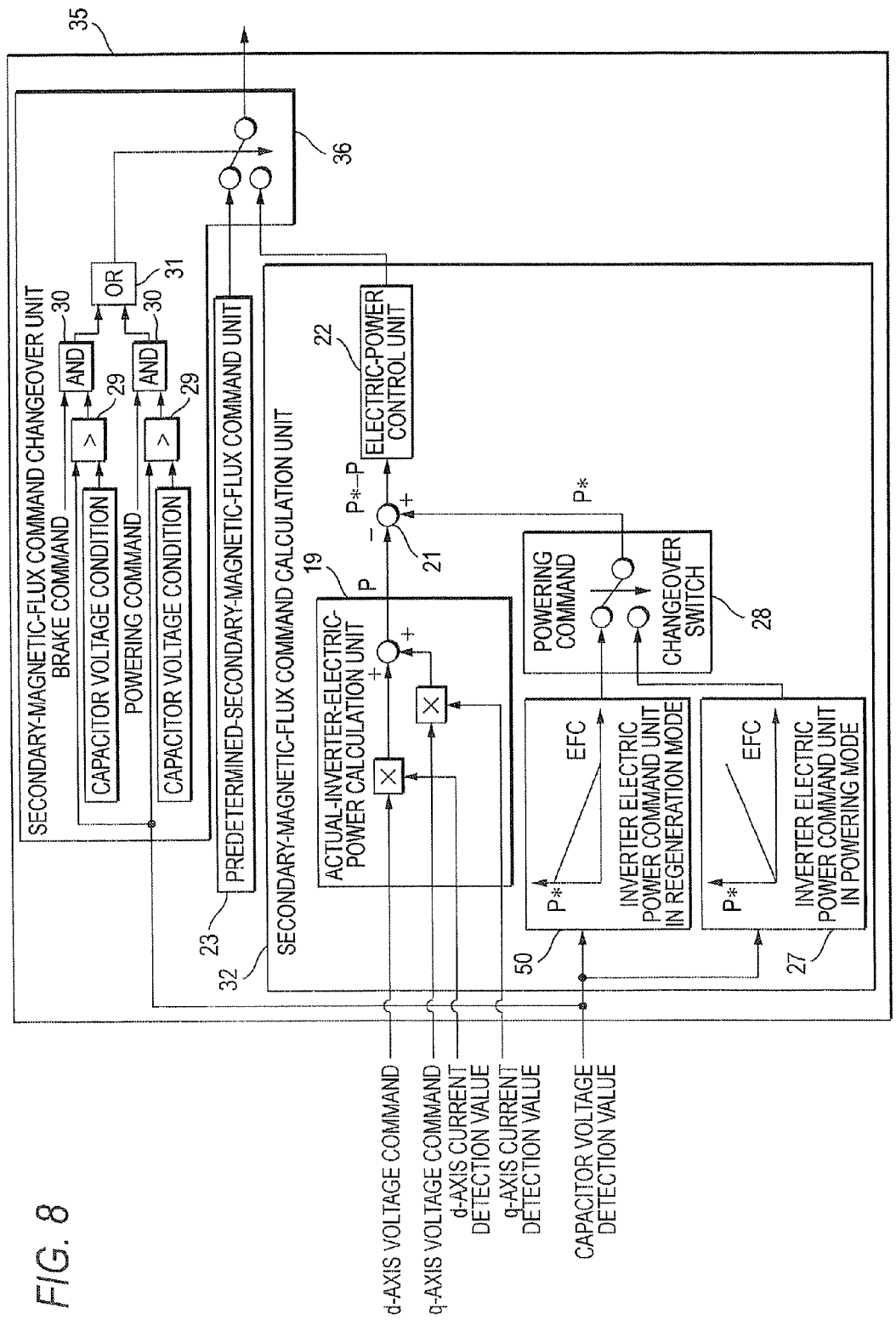
FIG. 8 It is a block diagram showing the practicable configuration of command secondary-magnetic-flux calculation/changeover means in Embodiment 4.

FIG. 8 is a block diagram showing the practicable configuration of the command secondary-magnetic-flux calculation/changeover means 35.

In Embodiment 2 stated before, the condition based on the capacitor voltage has been set in the powering mode so as to select the secondary-magnetic-flux command calculation unit even in the powering mode.

Besides, in Embodiment 3, the condition based on the capacitor voltage has been set in the regeneration mode so as to select the secondary-magnetic-flux command calculation unit.

In contrast, as understood from the configuration of a secondary-magnetic-flux command changeover unit 36, Embodiment 4 consists in that an output (command value) from a secondary-magnetic-flux command calculation unit 32 is selected by a brake command in both the regeneration mode and the powering mode, and that the output (command value) from the secondary-magnetic-flux command calculation unit 32 is selected by setting conditions based on a capacitor voltage.

In this way, there are the advantages that, in the powering mode, the AC electric motor becomes the regenerative load of the power source when the capacitor voltage has risen, and that, in the regeneration mode, an energy saving operation can be performed.

Incidentally, the secondary-magnetic-flux command changeover unit 36 can select the output (command) from the secondary-magnetic-flux command calculation unit 32 when the capacitor voltage becomes greater than a certain value in the powering or regeneration mode.

The other functions and operations are the same as in Embodiments 1, 2 and 3.

As described above, the secondary-magnetic-flux command changeover means (secondary-magnetic-flux command changeover unit 36) of the control apparatus for the AC electric motor according to this embodiment selects a predetermined secondary-magnetic-flux command value from the predetermined-secondary-magnetic-flux command means (predetermined-secondary-magnetic-flux command unit 23) or the secondary-magnetic-flux command value from the secondary-magnetic-flux command calculation means (secondary-magnetic-flux command calculation unit 32), in accordance with the voltage information of the variable-voltage variable-frequency inverter 1, in both the powering operation mode and regeneration operation mode of this variable-voltage variable-frequency inverter 1.

Thus, in the powering mode, the AC electric motor becomes the regenerative load when the capacitor voltage has risen, and in the regeneration mode, the energy saving operation can be performed.

Embodiment 5

Figure 9:
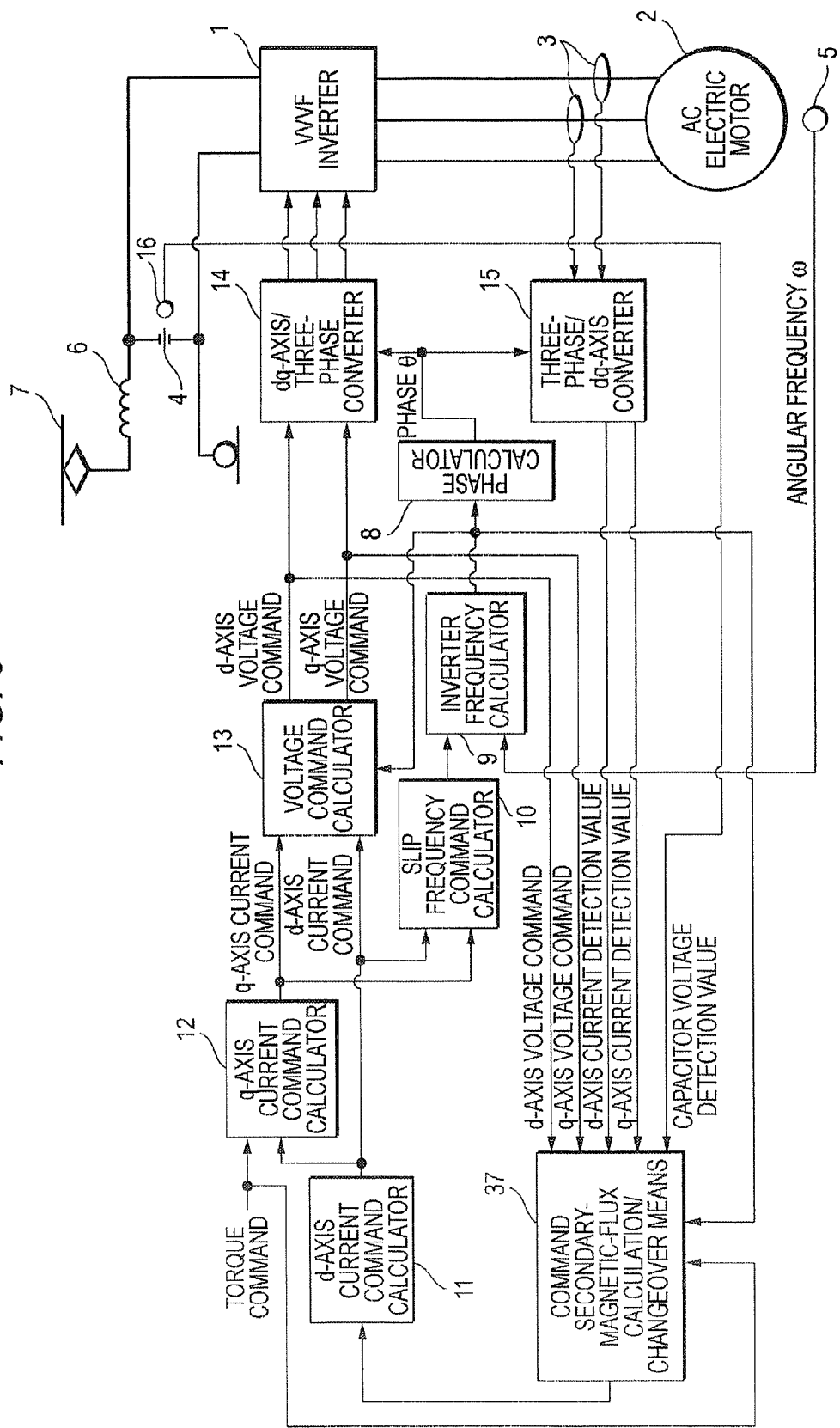
FIG. 9 It is a diagram showing the configuration of a control apparatus for an AC electric motor according to Embodiment 5.

FIG. 9 is a block diagram showing the configuration of a control apparatus for an AC electric motor according to Embodiment 5.

In this embodiment, the configuration of command secondary-magnetic-flux calculation/changeover means 37 differs from that of the command secondary-magnetic-flux calculation/changeover means in any of Embodiment 1-Embodiment 4.

Figure 10:
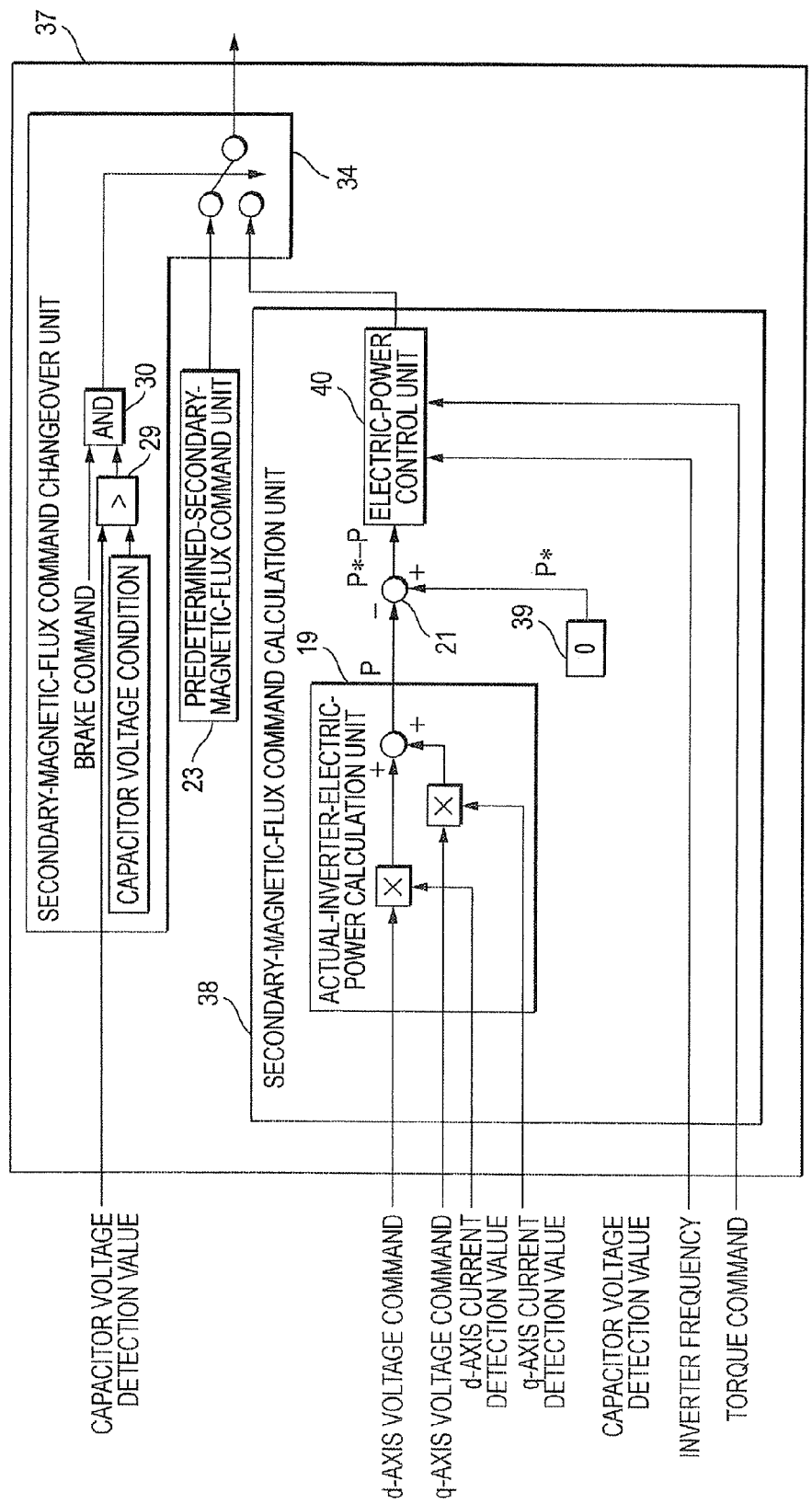
FIG. 10 It is a block diagram showing the practicable configuration of command secondary-magnetic-flux calculation/changeover means in Embodiment 5.

FIG. 10 is a block diagram showing the practicable configuration of the command secondary-magnetic-flux calculation/changeover means 37.

In this embodiment, a secondary-magnetic-flux command calculation unit 38 is configured supposing that a no-load state where any regenerative load does not exist on the power source side continues.

Especially, this embodiment features that a secondary-magnetic-flux command is calculated without regenerating the electric power of the inverter to the overhead line side in the no-load state, and without altering a torque which the AC electric motor 2 generates.

In this embodiment, an inverter electric-power command P*=0 is given by a zero-inverter-electric-power command unit (namely, an inverter-electric-power command unit which makes the command value of inverter electric-power zero) 39.

Besides, the electric-power control unit 22 in Embodiment 1, etc. has amplified the deviation between the inverter electric-power command P* and the actual inverter-electric-power P.

An electric-power control unit 40 in this embodiment, however, calculates a secondary-magnetic-flux command value $\phi^*$ which can make the electric power of the inverter zero without altering the torque that the AC electric motor generates, by the electric-power deviation (P*−P), an inverter frequency ωinv, a torque command τ*, and a primary inductance Ls, a primary resistance Rs, a mutual inductance M and the number p of pole pairs as are the motor constants of the AC electric motor.

The secondary-magnetic-flux command $\phi^*$ can be given by the following formula (8):

[Equation 1]

$$\phi^* = \frac{\sqrt{-2 \times p \times Rs \times [A + \sqrt{B}]}}{2 \times Rs \times p} \quad (8)$$

where $A = \omega inv \times \tau^* \times M^2 - M^2 \times (P^* - P) \times p$ $B = \omega inv^2 \times \tau^{*2} \times M^4 - 2 \times \omega inv \times \tau^* \times M^4 \times (P^* - p) \times p + M^4 \times (P^* - p)^2 \times p^2 - 4 \times Rs^2 \times \tau^{*2} \times Lr^2$ As in the case of Embodiment 3, the secondary-magnetic-flux command changeover unit 34 can select the output (command) from the secondary-magnetic-flux command calculation unit 38 when a capacitor voltage becomes greater than a certain value in the regeneration mode.

In the case of the no-load state where the regenerative load does not exist at all, the capacitor voltage rises. Therefore, when the capacitor voltage rises, the secondary-magnetic-flux command calculation unit is selected, and the secondary-magnetic-flux command which can make the electric power of the inverter zero is calculated by the electric-power calculation unit 40.

Thus, the AC electric motor can be stably controlled even in the no-load state where the load does not exist at all in the regeneration mode, to bring forth the advantage that the control apparatus for the AC electric motor, in which a brake operation can be performed by stably and reliably obtaining an electrical braking torque with the simple configuration even in a case where the load of the input power source side has become null, a case where the regeneration absorption device of a substation facility being the power source has broken, etc., can be provided.

As described above, the control apparatus for the AC rotary machine according to this embodiment is provided with the zero-inverter-electric-power command means (zero-inverter-electric-power command unit 39) which makes the command value of the electric power zero, instead of the inverter-electric-power command means (inverter-electric-power command unit 20), and the secondary-magnetic-flux command calculation means (secondary-magnetic-flux command calculation unit 38) calculates the secondary-magnetic-flux command on the basis of the actual inverter-electric-power value calculated by the actual-inverter-electric-power calculation means (actual-inverter-electric-power calculation unit 19) and the output of the zero-inverter-electric-power command means (zero-inverter-electric-power command unit 39).

In this manner, the inverter electric-power command P*=0 is given by the zero-inverter-electric-power command means (zero-inverter-electric-power command unit 39), whereby the inverter electric-power can be controlled to zero.

Besides, the secondary-magnetic-flux command calculation means (secondary-magnetic-flux command calculation unit 38) of the control apparatus for the AC rotary machine according to this embodiment includes the electric-power control means (electric-power control unit 40) for calculating the electric power which the variable-voltage variable-frequency inverter 1 generates, so as to become zero without altering the torque which the AC electric motor 2 generates.

Accordingly, the electric power which the variable-voltage variable-frequency inverter generates can be made zero without altering the torque which the AC electric motor 2 generates.

Besides, the secondary-magnetic-flux command changeover means (secondary-magnetic-flux command changeover unit 34) of the control apparatus for the AC rotary machine according to this embodiment selects the predetermined secondary-magnetic-flux command value from the predetermined-secondary-magnetic-flux command means (predetermined-secondary-magnetic-flux command unit 23), when the variable-voltage variable-frequency inverter 1 is in the powering operation mode, and it selects the predetermined secondary-magnetic-flux command value from the predetermined-secondary-magnetic-flux command means (predetermined-secondary-magnetic-flux command unit 23) or the secondary-magnetic-flux command value from the secondary-magnetic-flux command calculation means (secondary-magnetic-flux command calculation unit 38), in accordance with the voltage information of the variable-voltage variable-frequency inverter 1, when this variable-voltage variable-frequency inverter 1 is in the regeneration operation mode.

Thus, the AC rotary machine can be stably controlled even in the no-load state where the regenerative load does not exist at all, and a brake operation can be performed by stably and reliably obtaining an electrical braking torque with the simple configuration even in a case where the load of the input power source side has become null, a case where the regeneration absorption device of a substation facility being the power source has broken, etc.

By the way, in Embodiment 1-Embodiment 5 stated before, there have been described the configurations and advantages in the case of controlling the AC electric motor which is one example of the AC rotary machine.

However, the same advantages are obtained even in a case where the AC rotary machine is a dynamo, a synchronous machine, an induction machine or the like.

In the case of the dynamo, for example, the quantity of electric power which the dynamo generates can be easily controlled and adjusted by the inverter electric-power command P*, and a stable control system can be configured.

INDUSTRIAL APPLICABILITY

A control apparatus or a control method for an AC rotary machine according to this invention can be extensively applied to the controls of various rotary machines such as a synchronous machine, an induction machine and a dynamo.

The invention claimed is:

1. A control apparatus for an AC rotary machine, wherein the AC rotary machine is controlled on the basis of a secondary-magnetic-flux command value, comprising:
   a variable-voltage variable-frequency inverter which converts a DC into an AC of any desired frequency, and which exchanges electric power between it and the AC rotary machine;
   voltage detection means for detecting voltage information of a DC side of said variable-voltage variable-frequency inverter;
   current detection means for detecting current information items of an AC side of said variable-voltage variable-frequency inverter;
   inverter-electric-power command means for determining an inverter-electric-power command value which is a command value of the electric power to be converted by said variable-voltage variable-frequency inverter, in accordance with the voltage information which said voltage detection means detects;
   actual-inverter-electric-power calculation means for calculating an actual inverter-electric-power value which is the electric power converted by said variable-voltage variable-frequency inverter, on the basis of the current information items which said current detection means detect;
   secondary-magnetic-flux command calculation means for calculating the secondary-magnetic-flux command value for the AC rotary machine, on the basis of a difference between the inverter-electric-power command value and the actual inverter-electric-power value;
   predetermined-secondary-magnetic-flux command means for outputting a predetermined secondary-magnetic-flux command value for the AC rotary machine; and
   secondary-magnetic-flux command changeover means for selecting either of the secondary-magnetic-flux command value from said secondary-magnetic-flux command calculation means and the predetermined secondary-magnetic-flux command value from said predetermined-secondary-magnetic-flux command means, as the secondary-magnetic-flux command value which is used for controlling the AC rotary machine through said variable-voltage variable-frequency inverter.

2. A control apparatus for an AC rotary machine as defined in claim 1, wherein said secondary-magnetic-flux command changeover means selects the predetermined secondary-magnetic-flux command value from said predetermined-secondary-magnetic-flux command means, when said variable-voltage variable-frequency inverter is in a powering operation mode, and selects the secondary-magnetic-flux command value from said secondary-magnetic-flux command calculation means, when said variable-voltage variable-frequency inverter is in a regeneration operation mode.

3. A control apparatus for an AC rotary machine as defined in claim 1, wherein said secondary-magnetic-flux command changeover means selects the predetermined secondary-magnetic-flux command value from said predetermined-secondary-magnetic-flux command means or the secondary-magnetic-flux command value from said secondary-magnetic-flux command calculation means, in accordance with the voltage information of said variable-voltage variable-frequency inverter, when said variable-voltage variable-frequency inverter is in a powering operation mode, and selects the secondary-magnetic-flux command value from said secondary-magnetic-flux command calculation means, when said variable-voltage variable-frequency inverter is in a regeneration operation mode.

4. A control apparatus for an AC rotary machine as defined in claim 1, wherein said secondary-magnetic-flux command changeover means selects the predetermined secondary-magnetic-flux command value from said predetermined-secondary-magnetic-flux command means, when said variable-voltage variable-frequency inverter is in a powering operation mode, and selects the predetermined secondary-magnetic-flux command value from said predetermined-secondary-magnetic-flux command means or the secondary-magnetic-flux command value from said secondary-magnetic-flux command calculation means, in accordance with the voltage information of said variable-voltage variable-frequency inverter, when said variable-voltage variable-frequency inverter is in a regeneration operation mode.

5. A control apparatus for an AC rotary machine as defined in claim 1, wherein said secondary-magnetic-flux command changeover means selects the predetermined secondary-magnetic-flux command value from said predetermined-secondary-magnetic-flux command means or the secondary-magnetic-flux command value from said secondary-magnetic-flux command calculation means, in accordance with the voltage information of said variable-voltage variable-frequency inverter, in both a powering operation mode and a regeneration operation mode of said variable-voltage variable-frequency inverter.

6. A control apparatus for an AC rotary machine as defined in claim 1, further comprising:
  zero-inverter-electric-power command means for making the command value of the electric power zero instead of said inverter-electric-power command means; and
  wherein said secondary-magnetic-flux command calculation means calculates the secondary-magnetic-flux command on the basis of the actual inverter-electric-power value calculated by said actual-inverter-electric-power calculation means and the output of said zero-inverter-electric-power command means.

7. A control apparatus for an AC rotary machine as defined in claim 6, wherein said secondary-magnetic-flux command calculation means includes electric-power control means for calculating the electric power which said variable-voltage variable-frequency inverter generates, so as to become zero, without altering a torque which the AC rotary machine generates.

8. A control apparatus for an AC rotary machine as defined in claim 7, wherein said secondary-magnetic-flux command changeover means selects the predetermined secondary-magnetic-flux command value from said predetermined-secondary-magnetic-flux command means, when said variable-voltage variable-frequency inverter is in a powering operation mode, it selects the predetermined secondary-magnetic-flux command value from said predetermined-secondary-magnetic-flux command means or the secondary-magnetic-flux command value from said secondary-magnetic-flux command calculation means, in accordance with the voltage information of said variable-voltage variable-frequency inverter, when said variable-voltage variable-frequency inverter is in a regeneration operation mode.

9. A control apparatus for an AC rotary machine as defined in claim 6, wherein said secondary-magnetic-flux command changeover means selects the predetermined secondary-magnetic-flux command value from said predetermined-secondary-magnetic-flux command means, when said variable-voltage variable-frequency inverter is in a powering operation mode, and selects the predetermined secondary-magnetic-flux command value from said predetermined-secondary-magnetic-flux command means or the secondary-magnetic-flux command value from said secondary-magnetic-flux command calculation means, in accordance with the voltage information of said variable-voltage variable-frequency inverter, when said variable-voltage variable-frequency inverter is in a regeneration operation mode.

10. A control method for an AC rotary machine, wherein the AC rotary machine is controlled on the basis of a secondary-magnetic-flux command value, comprising:
  a voltage detection step of detecting voltage information of a DC side of a variable-voltage variable-frequency inverter which exchanges electric power between it and the AC rotary machine;
  a current detection step of detecting current information items of an AC side of the variable-voltage variable-frequency inverter;
  an inverter-electric-power command step of determining an inverter-electric-power command value which is a command value of the electric power to be converted by the variable-voltage variable-frequency inverter, in accordance with the voltage information which is detected at said voltage detection step;
  an actual-inverter-electric-power calculation step of calculating an actual inverter-electric-power value which is the electric power converted by the variable-voltage variable-frequency inverter, on the basis of the current information items which are detected at said current detection step;
  a secondary-magnetic-flux command calculation step of calculating the secondary-magnetic-flux command value for the AC rotary machine, on the basis of a difference between the inverter-electric-power command value and the actual inverter-electric-power value;
  a predetermined-secondary-magnetic-flux command step of outputting a predetermined secondary-magnetic-flux command value for the AC rotary machine; and
  a secondary-magnetic-flux command changeover step of selecting either of the secondary-magnetic-flux command value at said secondary-magnetic-flux command calculation step and the predetermined secondary-magnetic-flux command value at said predetermined-secondary-magnetic-flux command step, as the secondary-magnetic-flux command value which is used for controlling the AC rotary machine through the variable-voltage variable-frequency inverter.

* * * * *